Joseph P. Strock,
INVENTOR

Joseph P. Strock,
INVENTOR.

United States Patent Office 3,537,004
Patented Oct. 27, 1970

3,537,004
AUTOMATIC METER RANGE CHANGER
Joseph P. Strock, Syracuse, N.Y., assignor, by mesne assignments, to the United States of America as represented by the Secretary of the Army
Filed Jan. 21, 1969, Ser. No. 792,669
Int. Cl. G01r *15/08*
U.S. Cl. 324—115                                                6 Claims

ABSTRACT OF THE DISCLOSURE

An automatic range changer for radio frequency signal meters where the input signal has a high power level shift, the range changer having two low hysteresis direct current level sensors that determine if the meter movement is off scale up or down. The sensed voltage change on one of the sensors is passed through one of two control loops where each control loop comprises a differential amplifier, a unijunction transistor oscillator and feeds into reversible shift register that controls reed relay switching for the radio frequency meter. The reversible shift register will either shift up or down due to whether the meter input signal is off scale up or down from its previous scale.

BACKGROUND OF THE INVENTION

This invention is in the field of radio frequency power meter automatic range changers and is, particularly, a radio frequency automatic range changer employing extremely small well shielded reed relays as range switches.

A major problem encountered in existing radio frequency power meter range changers is the slowness in switching from one scale to another using a motor controlled rotary switch. Most all the meters that have any automatic range changing instruments are of the digital voltmeter class.

SUMMARY OF THE INVENTION

This invention comprises means for changing the range on a radio frequency power meter automatically when an input signal to the meter varies over a large power level. The range changer of the present invention has two sensing circuits for sensing any deviation of the input signal either up or down. Each sensing circuit is connected to the input of a positive feedback amplifier that produces the necessary high gain for triggering their respective unijunction transistor oscillators.

The outputs of each of the unijunction transistor oscillators are connected to a silicon controlled rectifier shift register such that when the upper scale circuit unijunction transistor oscillator is activated, it impresses a shift up pulse to the reversible shift register, and when the lower scale circuit unijunction oscillator is activated, it impresses a shift down pulse to the reversible shift register. Extremely small, well shielded, reed relays that are activated by the silicon controlled rectifier circuits of the shift register are used as the range switches.

It is an object of this invention to provide automatic range changing means for radio frequency meters when the input power levels vary over a large power level.

It is another object of this invention to provide an extremely fast acting radio frequency meter range changer.

It is a further object of this invention to provide a solid state radio frequency meter range changer utilizing reed relay switches at the outputs of a reversible shift register.

Other objects will be readily appreciated and the invention may be better understood by references to the following detailed description when considered in connection with the accompanying drawing.

DETAILED DESCRIPTION OF THE DRAWING

Figure 1:
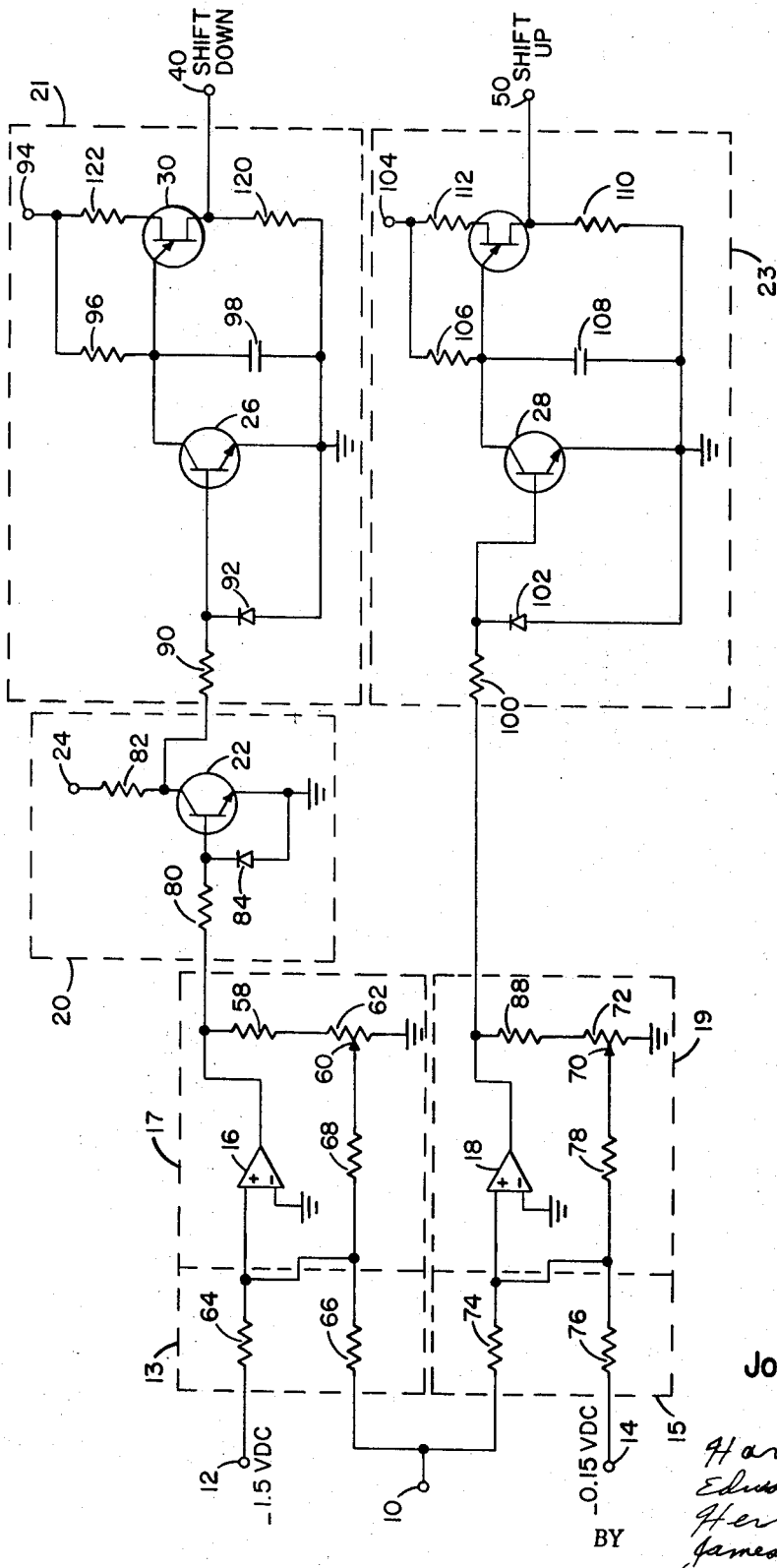
FIG. 1 is a schematic diagram of a sensing circuit and control loop circuits of an automatic radio frequency meter range changer of the present invention.

Refer now to FIG. 1 for a description of the sensing and control loop circuits of the automatic meter range changer. At terminal 10, a ground referenced output that is proportional to meter deflection of the radio frequency meter to be range shifted is applied. At terminals 12 and 14, reference voltages indicating the lower and upper ends of the radio frequency meter are impressed. The reference voltage of —1.5 volts DC at the lower terminal 12 and the —0.15 volts DC at the upper terminal 14 are set by potentiometers across a Zener reference diode (not shown). A first resistor 64 and a second resistor 66 from a first resistor summing network constituting a first low hysteresis direct current level sensor 13 for sensing any lowering of voltage at terminal 10, and a third resistor 74 and fourth resistor 76 from a second resistor summing network constituting a second low hysteresis direct current level sensor 15 for sensing any rise in voltage at terminal 10. The output from the first low hysteresis direct current level sensor 13 is applied to a first control loop consisting of amplifier circuit 17, converter circuit 20 and a first unijunction transistor oscillator circuit 21. The output from the first low hysteresis direct current level sensor 13 is connected to a positive terminal of differential amplifier 16 in the first amplifier circuit 17. The output from the second low hysteresis direct current level sensor 15 is applied to a second control loop consisting of amplifier circuit 19 and a second unijunction transistor oscillator circuit 23, and is connected to a positive terminal of positive feedback amplifier 18 in the second amplifier circuit 19.

Differential amplifiers 16 and 18 are connected as positive feedback amplifiers and provide the necessary high gain for low hysteresis triggering. In the first amplifier circuit 17, a voltage is picked off potentiometer 62 by pointer 60 and is fed back across dropping resistor 68 to the positive input terminal of amplifier 16. Resistor 58 is used in coarse balancing the feedback voltage. Voltage from potentiometer 62 is used to supply the holding current into the positive input terminal of amplifier 16 when the voltages at terminals 10 and 12 are identical and opposite in polarity. The initial voltage adjustment is most easily made when both voltages at terminals 10 and 12 are equal to zero. Slight excesses or shortages of current at the positive input terminal of amplifier 16 on the order of one nanoampere will cause the output to switch to one or the other maximum voltage state. Because one nanoampere at the positive input terminal defines a state and the input resistors 64 and 66 of the first low hysteresis direct current level sensor 13, are one megohm, a hysteresis in the order of two millivolts is obtained.

The function of amplifier circuit 19 is identical to the function of amplifier circuit 17. That is, potentiometer 72 and resistor 88 are used in balancing the voltage for feedback through pointer 70 and resistor 78 to the positive input terminal of amplifier 18. Resistors 74 and 76 also have a resistance of one megohm. Initially, voltages at terminal 10 and 14 are equal and opposite in polarity.

The output voltage from amplifier circuit 17 is impressed on an inverter circuit 20 consisting of coupling resistor 80, transistor 22, diode 84 and resistor 82 connected from the collector electrode of transistor 22 to a positive voltage source connected at terminal 24. The output of inverter circuit 20 is fed into the first unijunction transistor oscillator circuit 21 consisting of a resistor 90 coupled into a base of transistor 26 with a diode 92 connected across the base-emitter junctions of transistor 26. The emitter of transistor 26 and anode of diode 92 are connected to ground. The collector of transistor 26 is connected to the emitter of unijunction transistor 30 through a junction point of resistor 96 and capacitor 98. Resistor 96 is connected to a positive voltage source at terminal 94 and capacitor 98 is connected to ground. Resistors 120 and 122 are used for biasing the unijunction transistor. The output from the first unijunction transistor oscillator circuit 21 is taken off the top part of resistor 120, at output terminal 40.

The output from amplifier circuit 19 is fed directly to a second unijunction transistor oscillator circuit 23 through resistor 100 to the base of transistor 28. A diode 102 is connected across the base-emitter junctions of transistor 28 with the anode of the diode and the emitter connected to ground. The collector of transistor 28 is connected to the emitter of unijunction transistor 32 through the junction of capacitor 108 and resistor 106. Resistor 106 is connected to a positive voltage source at terminal 104 and capacitor 108 is connected to ground. Resistors 110 and 112 are used for biasing unijunction transistor 32. The output of the second unijunction transistor oscillator circuit 23 is taken off the top of resistor 110, at terminal 50.

Figure 2:
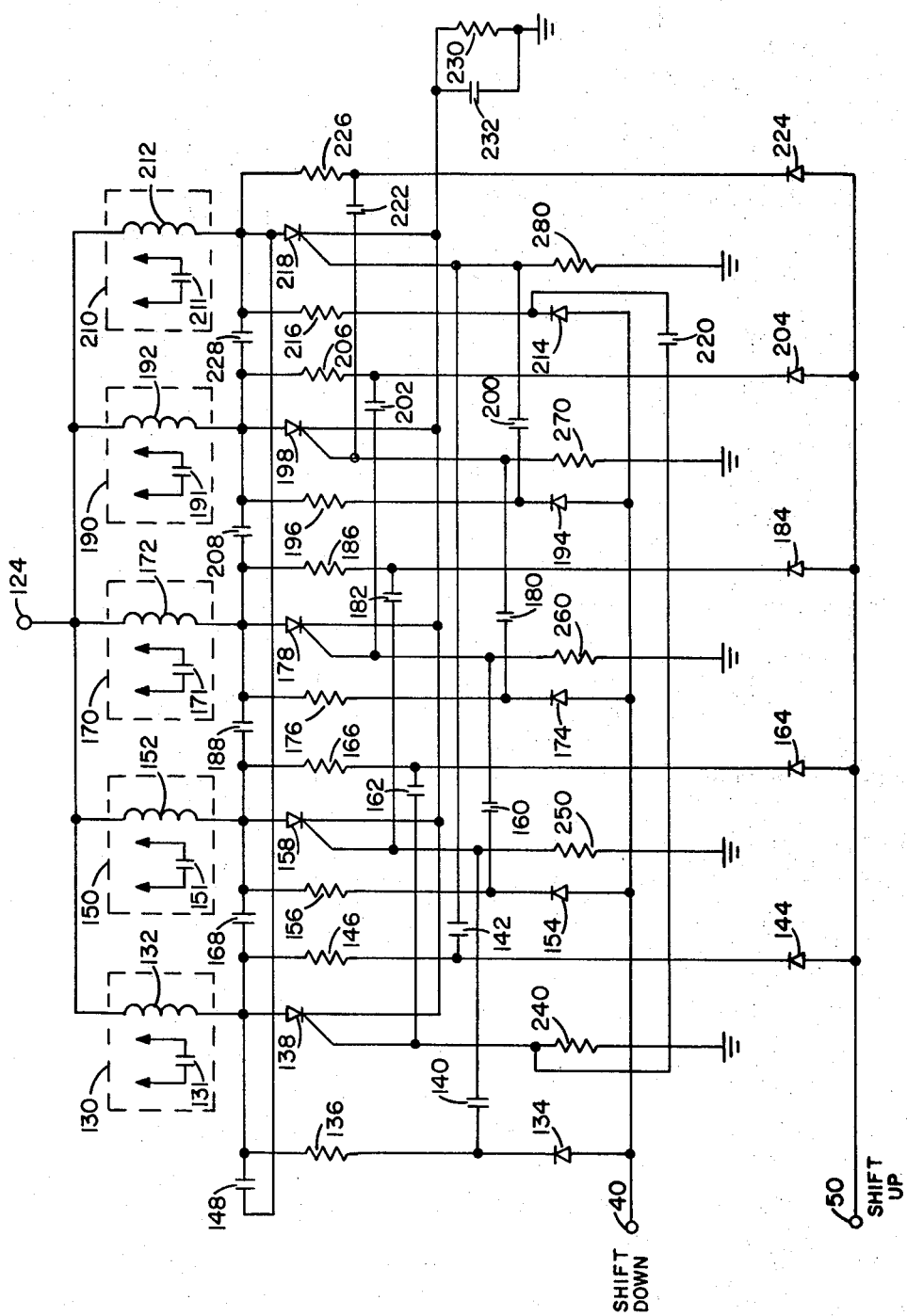
FIG. 2 is a schematic diagram of a reversible shift register and its reed relay outputs.

FIG. 2 illustrates the shift register circuit and reed relay switches of the present invention. The shift down signal is applied at a first input terminal 40 from the output of the first unijunction transistor oscillator circuit 21 and the shift up signal is applied at a second input terminal 50 from the output of the second unijunction transistor oscillator circuit 23. Terminal 40 is connected to the anodes of silicon controlled rectifiers 138, 158, 178, 198, and 218 through serially connected diode and resistor pairs 134 and 136, 154 and 156, 174 and 176, 194 and 196 and 214 and 216. Terminal 40 is further connected to the gate of the silicon controlled rectifiers adjacent and to the right through capacitors 140, 160, 180, 200 and 220. Terminal 50 is connected to the anodes of the silicon controlled rectifiers 138, 158, 178, 198 and 218 through serially connected diode and resistor pairs 144 and 146, 164 and 166, 184 and 186, 204 and 206 and 224 and 226. Terminal 50 is further connected to the gate of the silicon controlled rectifiers adjacent and to the left through capacitors 142, 162, 182, 202 and 222. Capacitors 148, 168, 188, 208, and 228 are connected between the anodes of silicon controlled rectifiers 218 and 138, 138 and 158, 158 and 178, 178 and 198, 198 and 218. The cathodes of all the silicon controlled rectifiers are connected to ground through a parallel combination of resistor 230 and capacitor 232. Five voltage ranges from high scale to low scale on the meter are represented by coil reed relays 130, 150, 170, 190, and 210. Reed relays 131, 151, 171, 191, and 211 are controlled by coils 132, 152, 172, 192 and 212 connected between the anodes of silicon controlled rectifiers 138, 158, 178, 198 and 218 and terminal 124, where a positive voltage is connected.

In operation, after the positive feedback amplifiers 16 and 18 are balanced, any deviation in the ground referenced output meter deflection from the radio frequency meter applied at terminal 10 will cause a shift in polarity at the output of one of the amplifier circuits 17 or 19 due to whether the voltage at terminal 10 is off scale low or off scale high. For example, if the meter voltage applied at terminal 10 is off scale low by one millivolt, the output of amplifier circuit 17 will shift from +12 volts to −12 volts. The inverter circuit 20 allows for consistency in defining when the meter is on scale. A +12 volts from both outputs of amplifier circuits 17 and 19 unijunction transistor oscillator circuits 21 and 23 indicate that the meter is on scale and no ranging is required. When it is necessary to shift up, the output of amplifier circuit 19 goes to −12 volts. The design of inverter circuit 20 is such that its output goes only to zero volts when it is necessary to shift down. This zero level or the −12 volt level are acceptable inputs to the base of either transistor 26 or transistor 28 for cutting them off.

When transistor 26 is cut off, voltage will begin to rise at the junction of resistor 96 and capacitor 98 and at the emitter of unijunction transistor 30. If the meter remains off scale low, unijunction transistor 30 will fire and a positive four volt pulse will be applied at its output terminal 40. A like positive four volt pulse will be applied at output terminal 50 of unijunction transistor 32 if the meter goes off scale high.

Now looking at FIG. 2 and assume a positive four volt pulse is impressed on the first input terminal 40 for shifting the scale down. Further, assume that silicon controlled rectifier 178 is conducting with the consequent coil reed relay 170 indicating the meter being at the middle of the scale. When silicon controlled rectifier 178 is conducting, its anode is about one volt above the cathode. This low voltage at the anode of silicon controlled rectifier 178 allows the positive pulse occurring at the first input terminal 40 to be coupled through diode 174 and capacitor 180 to the gate input of silicon controlled rectifier 198. Silicon controlled rectifier 198 will turn on diverting the anode current of silicon controlled rectifier 178 briefly through capacitor 208 into silicon controlled rectifier 198, causing silicon controlled rectifier 178 to cut off. Coil reed relay 190 will now be switched and the meter will be on scale in the next lowest scale. If the input power level to the meter remains off scale low then the process is repeated with silicon controlled rectifier 218 conducting and silicon controlled rectifier 198 being cut off. Coil reed relay 210 will be switched in at this point. Further, a reverse shift of the meter voltage when silicon controlled rectifier 218 is conducting will cause a positive four volt shift up pulse at the second input terminal 50 to be fed through diode 224 and capacitor 222 to the gate electrode of silicon controlled rectifier 198. Silicon controlled rectifier 198 will turn on and divert the anode current of silicon controlled rectifier 218 briefly through capacitor 228 into silicon controlled rectifier 198, causing silicon controlled rectifier 218 to cut off and coil reed relay 190 to be switched.

The foregoing is considered as illustrative only of the principles of the invention. While a specific embodiment of the invention has been shown and described, other embodiments may be obvious to one skilled in the art, in light of this disclosure. The invention should be limited in scope only by the following claims.

I claim:

1. An automatic range changer for large input signal power shift radio frequency meters comprising: first and second low hysteresis direct current level sensors, each of said first and second low hysteresis direct current level sensors having a first mutual input terminal connected therebetween, said first mutual input terminal adapted for being connected to an output of a radio frequency meter, each of said first and second low hysteresis direct current level sensors having a second input terminal and an output terminal, said second input terminals being adapted for connection to regulated references voltage sources; first and second control loops, said first control loop including a first differential amplifier circuit having an input and an output, an inverter circuit having an input and an output and a first oscillator circuit having an input and an output, said second control loop including a second differential amplifier circuit having an input and an output and a second oscillator circuit having an input and an output, said first and second differential amplifier circuit inputs being connected to said outputs of said first and second low hysteresis level sensors and ued for providing gain for said low hyteresis sensors, said output of said first differential amplifier circuit connected to said input of said inverter circuit, said output of said inverter circuit connected to said input of said first oscillator circuit, the output of said second differential amplifier circuit connected to the input of said second oscillator circuit; a silicon controlled rectifier reversible shift register having first and second inputs, said first input adaptable to receive a step down signal from the output of said first oscillator circuit and said second input adapted to receive a step up signal from the output of said second oscillator circuit, said silicon controlled rectifier reversible shift register having a plurality of reed relay switching circuits for switching the range of the radio frequency meter, said reed relay outputs being connected to an output of said reversible shift register such that only one of said reed relay switching outputs will be activated at any instant of time.

2. An automatic range changer as set forth in claim 1 wherein said first and second oscillator circuits are unijunction transistor oscillator circuits.

3. An automatic range changer as set forth in claim 2 wherein each of said first and second low hysteresis direct current level sensors include a two resistor summing network, with the two resistors connected in parallel for receiving the input signals from said output of the radio frequency meter and the regulated reference voltage source for the respective resistor summing network.

4. An automatic range changer as set forth in claim 3 wherein said two resistor summing network resistors are of one megohm resistance.

5. An automatic range changer as set forth in claim 4 wherein said plurality of said reed relay switching outputs is five reed relay switching outputs.

6. An automatic range changer as set forth in claim 5 wherein said regulated reference voltage at said second input of said first low hysteresis direct current level sensor is more negative than said regulated reference voltage at said second input of said second low hysteresis direct current level sensor.

References Cited

UNITED STATES PATENTS 2,682,000  6/1954  Clayton et al. ____ 324—115 XR

RUDOLPH V. ROLINEC, Primary Examiner

E. F. KARLSEN, Assistant Examiner